Jan. 3, 1950     H. H. KERR     2,493,250
SELF-ADJUSTING HYDRAULIC BRAKE MECHANISM
Filed Dec. 30, 1948     2 Sheets-Sheet 1
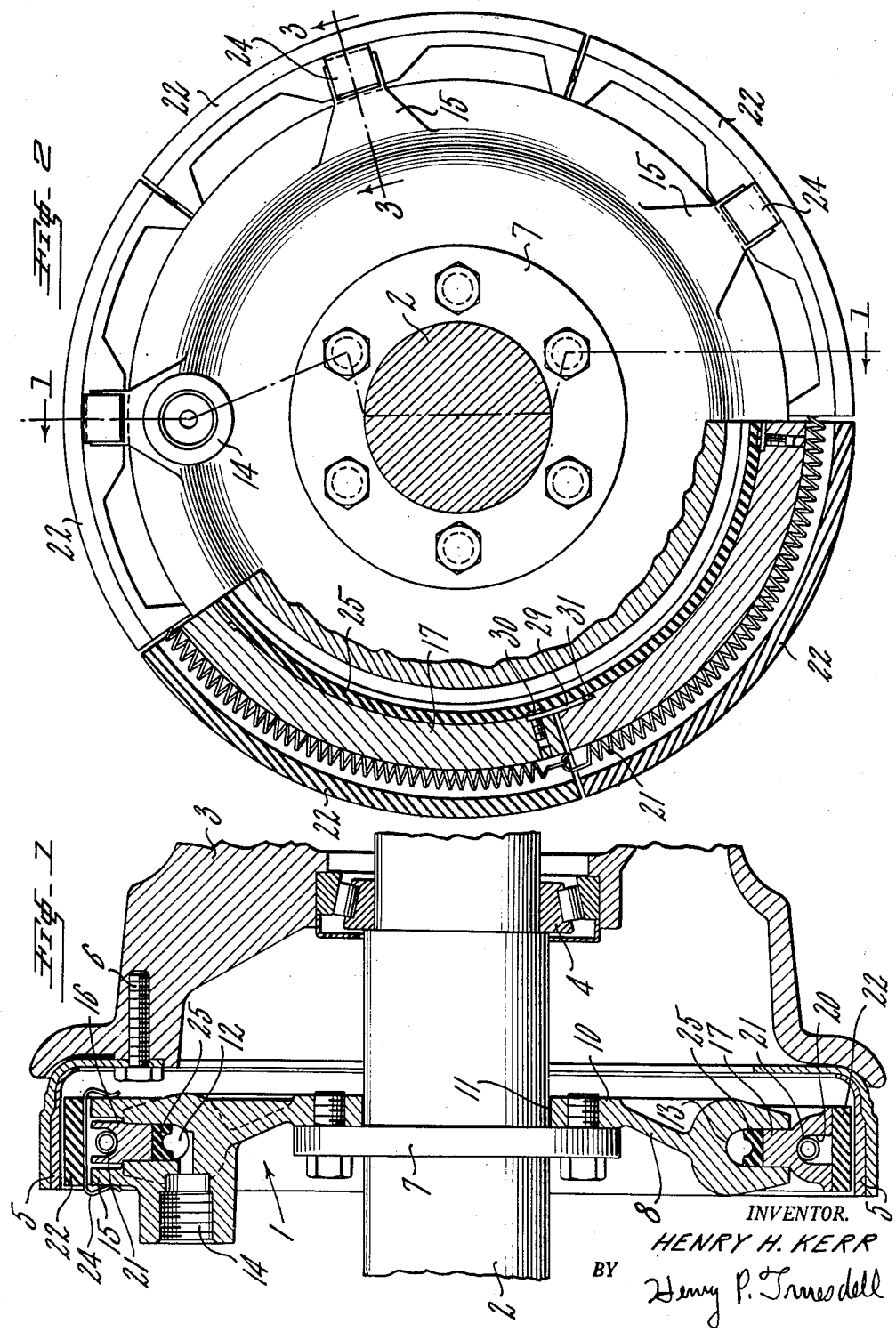
INVENTOR.
HENRY H. KERR
BY Henry P. Truesdell
ATTORNEY Jan. 3, 1950 H. H. KERR 2,493,250
SELF-ADJUSTING HYDRAULIC BRAKE MECHANISM
Filed Dec. 30, 1948 2 Sheets-Sheet 2
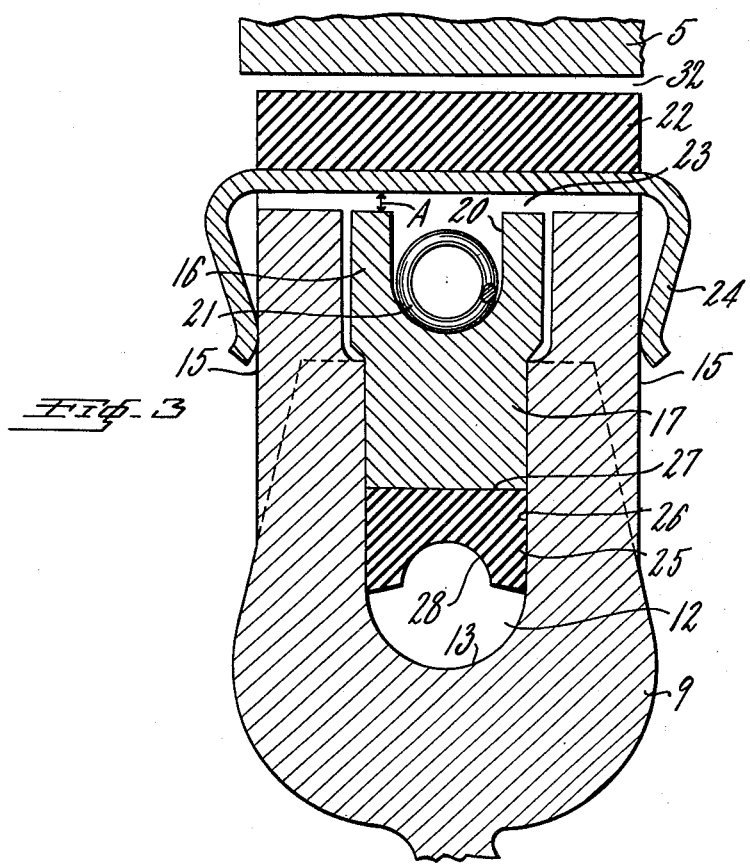
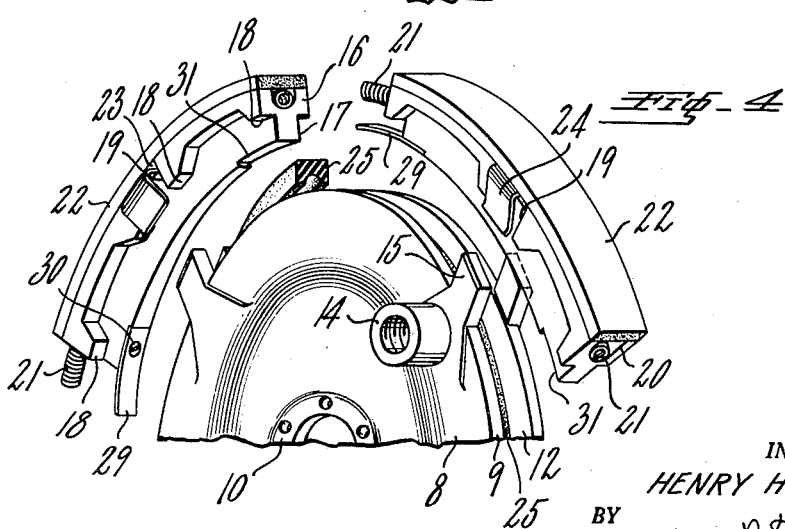
INVENTOR.
HENRY H. KERR
BY
Henry P. Truesdell
ATTORNEY Patented Jan. 3, 1950

2,493,250

UNITED STATES PATENT OFFICE 2,493,250

SELF-ADJUSTING HYDRAULIC BRAKE MECHANISM

Henry H. Kerr, Jackson, Mich., assignor to United States Rubber Company, New York, N. Y., a corporation of New Jersey Application December 30, 1948, Serial No. 68,332

9 Claims. (Cl. 188—152)

This invention relates to an hydraulic brake mechanism and more particularly to a new and improved hydraulic brake of the radially expanding type.

It is an object of the invention to provide a new and improved hydraulic brake mechanism which provides for positive and instant action of the brake blocks against the rotating brake drum and in which the liquid displacement on operation and release of the brake mechanism is kept at a minimum.

It is another object of the invention to provide an hydraulic brake mechanism in which the brake blocks adjust themselves to positions giving substantially constant clearance with the brake drum irrespective of normal wear of the friction lining carried by the brake blocks.

A further object of the invention is the provision of an improved hydraulic brake mechanism of simple construction having relatively few parts such that it can be easily manufactured, assembled and adjusted in use.

In the accompanying drawing,

Fig. 1 is a cross sectional view through an assembled brake drum and hydraulic brake mechanism taken substantially along the line 1—1 of Fig. 2;

Fig. 2 is a view in elevation of the brake mechanism with parts being broken away to show the interior arrangement of the elements;

Fig. 3 is an enlarged sectional view through part of the brake mechanism taken along the line 3—3 of Fig. 2; and Fig. 4 is an exploded view showing the manner in which the brake blocks are mounted on the supporting disk.

Referring to Fig. 1 of the drawing, a hydraulic brake mechanism 1, constructed in accordance with the present invention, is shown mounted on an axle 2 which, in turn, carries a wheel 3 rotating on a bearing 4. The brake mechanism cooperates with a brake drum 5 carried by the wheel and secured thereto in any suitable manner as by the bolts 6. The particular wheel and brake drum assembly form no part of the instant invention. The brake mechanism itself is held in fixed position with respect to the axle 2. In the installation shown, it is fastened to a flange 7 on the axle by means of a plurality of bolts.

Turning now to the construction of the brake mechanism and referring to Figs. 1 and 4, the mechanism includes a central supporting member or disk 8 having an outer annular edge 9 and a hub portion 10 provided with an opening 11 for receiving the axle 2, or other supporting member. The hub portion supports the brake mechanism on the axle and is secured to the flange 7 by the aforementioned bolts. The outer circumferential surface or edge 9 of the disk is provided with a channel 12 having parallel side walls and a curved bottom wall, as indicated at 13, to form, in effect, a recess in the disk which extends entirely around its perimeter. The recess formed by the annular channel 12 receives the hydraulic liquid for operating the brake, the liquid being fed thereto through a connection 14 on the disk. Extending at spaced intervals around the outer periphery of the disk are spaced lugs 15, one being located on each side of the channel 12. The lugs extend in a radial direction beyond the edge 9 and are formed with smooth surfaces.

Cooperating with the supporting disk 8 are a plurality of brake blocks 16 the number of which will depend upon the particular installation and the diameter of the supporting disk. Each brake block, as shown most clearly by Fig. 4, is provided with a tongue 17 which is narrower than the body of the block and which fits snugly into the channel 12 in the center supporting disk 8 so that the block is supported upon the outer circumferential edge of the disk which engages bearing surfaces 18 on the block. Each brake block is curved to an extent depending upon the radius of the supporting disk 8 so that it fits closely into engagement with the disk and the tongue 17 slides smoothly in the channel 12 as the brake block moves in and out upon operation of the mechanism. Each brake block is moved outwardly in a radial direction by the force of hydraulic liquid in the channel 12 in a manner to be described later.

On assembly, the lugs 15 extend into recesses 19 on opposite sides of the brake block and prevent the blocks from travelling or rotating over the surface of the supporting disk 8. Each brake block is provided with a longitudinal groove 20 for receiving a spiral tensioning spring 21. The grooves are covered and the outer surface of the brake block protected by a friction brake lining 22. The purpose of spring 21 is to retract the brake blocks from engagement with the brake drum upon release of the hydraulic pressure. Each brake block is likewise provided with a transverse groove 23 (Fig. 3) extending between recesses 19. A U-shaped spring clip 24 is located in each groove 23 and cooperates with the lugs 15 in a manner to be described later. In manufacture, the clips 24 are assembled in position in the grooves and then the friction brake lining 22 is placed in position on the brake block 16 and attached in any suitable way, as by cementing or riveting.

Prior to assembly of the brake blocks on the center disk, an expansible sealing gasket 25 is placed in the groove 12 to prevent escape of the hydraulic liquid and to provide a pressure member to act against the brake blocks to force them against the rotating brake drum carried by the wheel. The gasket comprises an annular ring 25 of natural or synthetic rubber, or other suitable resilient expansible material. As best shown in Fig. 3, it is provided with opposite flat sides 26 which cooperate with and slide along the flat sides of the channel 12. The upper flat surface 27 of the sealing gasket bears against the tongues 17 of the brake blocks to move the blocks outwardly when hydraulic pressure is applied. The lower surface of the sealing gasket, against which liquid pressure is applied, is provided with a curved surface 28 the effect of which is to spread the sidewalls of the gasket thereby making a fluid tight joint with the sidewalls of the channel 12 to prevent escape of the hydraulic fluid.

As the brake blocks expand outwardly upon operation of the brake mechanism, they tend to separate slightly. In order to prevent damage to the sealing gasket 25, or any bulging of the gasket at the points of separation, the space between the adjacent brake blocks is spanned by a leaf spring 29. The spring is suitably fastened to one of the brake blocks, as by a screw 30, and rides in a recess 31 in the other brake block. As the brake blocks move apart slightly, on operation of the brake mechanism, the spring blade 29 slides along the recess 31 and prevents the sealing gasket from expanding into any small space between the brake blocks and likewise prevents the gasket from being scored or damaged by the sharp edges of the blocks.

In assembling the mechanism, the annular sealing gasket 25 is stretched and slipped into position in the channel 12 in the supporting disk. Thereafter, the brake blocks are assembled in position on the disk and the tension spring 21 threaded through the grooves 20 in the brake blocks, the spring being fastened together at one of the points separating adjacent brake blocks.

In operation of the brake mechanism, liquid pressure is applied to the recess formed by the channel 12 to expand the sealing gasket 25 against the tongues 17 on the brake blocks and the leaf springs 29 so that the blocks move outwardly to frictionally engage the brake drum 5. As the assembly of brake blocks expands, the tongues 17 slide easily in the channel 12 and the spring clips 24 slide over the surfaces of the lugs 15. Upon release of the fluid pressure, the tension spring 21 retracts the brake blocks from engagement with the brake drum and releases the brake mechanism to permit free rotation of the wheel 3.

As the friction lining 22 wears upon use of the brake mechanism there would normally be an increase in the clearance between the surface of the lining and the brake drum, as indicated at 32 in Fig. 3, which means that the brake blocks would have an increased distance to move through to engage the brake drum each time the brake mechanism is operated. This has the disadvantage that, as the brake lining wears, it requires an increased movement of the brake block, with a consequent increase in the amount of liquid which must be forced into the mechanism, to operate the brakes. With a number of brake mechanisms attached to a single source of fluid pressure a corresponding increase in displacement of the liquid in the system would be required.

However, according to the present invention, any wear in the brake lining is compensated for so that the brake block is always maintained at a substantially constant clearance between the brake block and the brake drum. To this end, the spring clips 24 frictionally engage the lugs 15 with a force sufficient to overcome the action of the retracting spring 21. This action may be best understood by referring to Fig. 3. The groove 23 in which the spring 24 floats is provided with a clearance space indicated at A, in Fig. 3. The space is made the same as the desired clearance 32 between the brake drum 5 and the outer surface of the brake lining 22. Assuming the U-shaped spring clip 24 to be held in fixed position on the lugs 15 then it will be seen that the brake block may move in and out radially a distance measured by the clearance A without any corresponding movement of the spring clip 24 along the surfaces of the lugs. Since the tension applied by the coiled spring 21 is insufficient to move the spring clips 24 along the lugs the only action of this spring, upon release of the hydraulic pressure, will be to retract the brake blocks through the distance measured by the clearance A so that the linings 22 rest on the clips 24. In other words, as liquid pressure is applied on operation of the brake mechanism, the brake blocks are moved outwardly until they engage the brake drum and the force of the liquid pressure is sufficient to carry the spring clips 24 along the surfaces of the lugs 15 to a point at which the brake lining engages the brake drum. The spring clips then remain in this position. Upon release of the brake mechanism, the tension spring 21 retracts the brake blocks through the distance represented by the clearance space A, in the manner already mentioned, to provide the proper clearance 32 between the brake lining and the brake drum. But the spring clips 24 are not moved downwardly on the lugs 15 by the spring 21. In this way, minimum clearance is maintained between the brake lining and the brake drum irrespective of any wear which may take place in the friction lining 22. As the lining wears, the spring clips move outwardly gradually during successive cycles of operation of the brake.

By locating the tension spring 21 in grooves in the brake blocks the spring acts uniformly on the sealing gasket 25 to contract it but since it does not engage the surface of the gasket there is no danger of damage thereto and the convolutions of the spring are prevented from scoring or rubbing against the gasket surface. In manufacture, the gasket 25 is made of a diameter such that it will not contract of itself when distended beyond its original installed diameter as the brake linings become worn. This means that the gasket bears against the brake blocks at all times and is contracted only by the action of spring 21.

The brake mechanism is of simple construction having relatively few parts and may be easily assembled in the manner indicated. It is effective in applying a high braking torque to the brake drum.

Having thus described my invention, what I claim and desire to protect by Letters Patent is:

1. In an hydraulic brake mechanism, a supporting disk having an annular outer edge with a channel therein, said disk being provided with pairs of lugs extending radially beyond said edge, a plurality of brake elements seated on said outer edge and having tongue portions extending into said channel, a U-shaped spring clip carried by each of said brake elements and adapted frictionally to engage one of said pairs of lugs, said brake elements being moveable a predetermined distance with respect to said clip depending upon the desired clearance with an associated brake drum, a coiled spring biasing said brake elements toward said disk and means including an expansible sealing member in said channel cooperating with said tongue portions to move said brake elements radially outwardly against the action of said spring and the frictional grips of said clips on said lugs upon application of liquid pressure to said channel, said spring acting to return said brake elements toward said disk through said predetermined distance upon release of the liquid pressure.

2. In an hydraulic brake mechanism, a supporting disk having an annular outer edge with a channel therein, said disk being provided with pairs of lugs extending radially beyond said edge, a plurality of brake elements seated on said outer edge and having portions extending between said lugs into said channel, a U-shaped spring clip carried by each of said brake elements and adapted frictionally to engage the lugs of one pair, there being relative movement between each of said clips and a corresponding brake element, spring means cooperating with said brake elements to move them towards said disk, and an expansible sealing means in said channel cooperating with said brake elements to move them radially outwardly against the action of said spring means, said spring means acting to return said brake elements towards said disk until restrained by said clips.

3. In an hydraulic brake mechanism, a supporting disk having an annular outer edge with a channel therein, a plurality of brake elements resting on said outer edge and having portions extending into said channel, means carried by each of said brake elements frictionally engaging said disk, said means providing for small relative movements between said brake elements and said disk, spring means cooperating with said brake elements to move them towards said disk through the distance provided for by said friction means, and an expansible sealing means in said channel operable by liquid pressure to move said brake elements radially outwardly against the actions of said spring and friction means.

4. In a brake mechanism, a supporting disk having an annular outer edge, a plurality of brake elements resting on said outer edge, means carried by each of said brake elements frictionally engaging said disk, said means providing for small relative movements between said brake elements and said disk in amounts equal to the desired clearance between said brake element and a brake drum, spring means cooperating with said brake elements to retract them from operative position towards said disk through the clearance distance provided for by said friction means, and means carried by said disk to move said brake elements radially outwardly against the actions of said spring and friction means.

5. A brake mechanism for maintaining a predetermined clearance between a brake drum and cooperating friction brake elements upon release of the brake mechanism comprising, in combination, a plurality of brake elements, each of said elements having a transverse groove therein, a U-shaped spring clip floating in said groove and providing for relative movement between said clip and brake elements a distance equal to the desired clearance between said brake elements and the brake drum, a supporting disk having an annular edge with lugs extending radially beyond said edge, said brake elements being mounted on said edge with said spring clips in frictional engagement with said lugs, spring means biasing said brake elements into engagement with said clips, and means carried by said disk for moving said brake elements radially outwardly against the action of said spring means and the frictional drag of said clips.

6. A brake mechanism for maintaining a predetermined clearance between a brake drum and cooperating friction brake elements upon release of the brake mechanism comprising, in combination, a plurality of brake elements, each of said elements having recesses on opposite sides thereof and a transverse groove extending between the recesses, a U-shaped spring clip floating in said groove and providing for relative movement between said clip and brake element a distance equal to the desired clearance between said brake elements and the brake drum, a supporting disk having an annular edge with lugs extending radially beyond said edge, said brake elements being mounted on said edge with said lugs sliding into said recesses and said spring clips in frictional engagement with said lugs, a coiled spring cooperating with said brake elements normally to hold them in engagement with said clips in retracted position, and means carried by said disk to expand said brake elements radially outwardly against the action of said spring means and the frictional drag of said clips.

7. An hydraulic brake mechanism for maintaining a predetermined clearance between a brake drum and cooperating friction brake elements upon release of the brake mechanism comprising, in combination, a plurality of brake elements, each of said elements having recesses on opposite sides thereof and a transverse groove extending between said recesses, a friction member floating in said groove and being movable relative to said brake element a distance substantially equal to the desired clearance between said brake element and the brake drum, a supporting disk having an annular edge provided with a channel therein, said disk having lugs extending radially beyond said edge, said brake elements being mounted on said edge with said lugs sliding in said recesses and said friction members in frictional engagement with said lugs, a coil spring cooperating with said brake elements normally to hold them in engagement with said friction members in retracted position, and means including an expansible sealing member in said channel for expanding said brake elements radially outwardly against the action of said spring means and the drag of said friction members.

8. An hydraulic brake mechanism for maintaining a predetermined clearance between a brake drum and cooperating friction brake elements upon release of the brake mechanism comprising, in combination, a supporting disk having an annular edge having a channel therein and lugs extending radially beyond said edge, a plurality of brake elements resting on said edge, each of said elements having a tongue portion extending into said channel and recesses on opposite sides thereof, said brake element having a transverse groove extending between said recesses, a spring clip floating in said groove and providing for relative movement between said clip and brake element a distance substantially equal to the desired clearance between said brake elements and the brake drum, said brake elements being mounted on said edge with said lugs sliding in said recesses and said spring clips in frictional engagement with said lugs, a coil spring cooperating with said brake elements normally to hold them in engagement with said clips in retracted position, and means including an expansible sealing gasket in said channel cooperating with said brake elements to move them radially outwardly against the action of said spring means and the frictional drag of said spring clips.

9. In a hydraulic brake mechanism, a supporting disk having a recess for fluid therein, a brake element carried by said supporting means and having a portion extending into said recess, friction means disposed between said brake element and said disk, said friction means providing for small relative movements between said brake element and said disk, spring means cooperating with said brake element to move it toward said disk through the distance provided for by said friction means, and means in said recess operable by fluid pressure to move said brake element outwardly against the action of said spring and friction means.

HENRY H. KERR.

REFERENCES CITED

The following references are of record in the file of this patent:

UNITED STATES PATENTS

| Number | Name | Date |
|---|---|---|
| 2,229,922 | Heinze | Jan. 28, 1941 |
| 2,390,311 | Kupiec et al. | Dec. 4, 1945 |
| 2,423,315 | Hollerith | July 1, 1947 |

FOREIGN PATENTS

| Number | Country | Date |
|---|---|---|
| 369,177 | Great Britain | Mar. 17, 1932 |